(12) United States Patent
Yang et al.

(10) Patent No.: US 10,430,096 B2
(45) Date of Patent: Oct. 1, 2019

(54) HYBRID STORAGE DEVICE, COMPUTER, CONTROL DEVICE, AND POWER CONSUMPTION REDUCTION METHOD

(71) Applicants: Huawei Technologies Co., Ltd., Shenzhen (CN); Fudan University, Shanghai (CN)

(72) Inventors: RenHua Yang, Shanghai (CN); Junfeng Zhao, Shenzhen (CN); Wei Yang, Hangzhou (CN); Yinyin Lin, Shanghai (CN)

(73) Assignees: Huawei Technologies Co., Ltd., Shenzhen (CN); Fudan University, Shanghai (CN)

( * ) Notice: Subject to any disclaimer, the term of this patent is extended or adjusted under 35 U.S.C. 154(b) by 0 days.

(21) Appl. No.: 15/882,683

(22) Filed: Jan. 29, 2018

(65) Prior Publication Data

US 2018/0150254 A1 May 31, 2018

Related U.S. Application Data

(63) Continuation of application No. PCT/CN2016/092336, filed on Jul. 29, 2016.

(30) Foreign Application Priority Data

Jul. 30, 2015 (CN) .......................... 2015 1 0460606

(51) Int. Cl.
*G06F 3/06* (2006.01)
*G06F 1/3234* (2019.01)

(52) U.S. Cl.
CPC .......... *G06F 3/0634* (2013.01); *G06F 1/3268* (2013.01); *G06F 1/3275* (2013.01);
(Continued)

(58) Field of Classification Search
CPC ...... G06F 3/0625; G06F 3/0634; G06F 3/065; G06F 3/0653; G06F 3/068; G06F 3/0685; G06F 1/3268; G06F 1/3275; Y02D 10/154
See application file for complete search history.

(56) References Cited

U.S. PATENT DOCUMENTS

2005/0086433 A1 4/2005 Okaue et al.
2010/0313045 A1* 12/2010 Olarig ................... G06F 3/0634
713/320
(Continued)

FOREIGN PATENT DOCUMENTS

CN 1685436 A 10/2005
CN 101520689 A 9/2009
(Continued)

OTHER PUBLICATIONS

Zeng et al., "Power and Performance Trade-Offs in Contemporary DRAM System Designs for Multicore Processors," IEEE Transactions on Computers, vol. 59, No. 8, pp. 1033-1046, Institute of Electrical and Electronics Engineers, New York, New York (Aug. 2010).

(Continued)

*Primary Examiner* — Aracelis Ruiz
(74) *Attorney, Agent, or Firm* — Leydig, Voit & Mayer, Ltd.

(57) ABSTRACT

A hybrid storage device includes a controller, a volatile storage unit, and a non-volatile storage unit. When the hybrid storage device is in a first working mode, the volatile storage unit is in an enabled state, and the non-volatile storage unit is in a disabled state; when the hybrid storage device is in a second working mode, the non-volatile storage unit is in an enabled state, and the volatile storage unit is in a disabled state. When the hybrid storage device runs in the first working mode, and when detecting that a running (Continued)

parameter of the computer meets a first switching condition, the controller enables the non-volatile storage unit, copies data in the volatile storage unit to the non-volatile storage unit, and switches the hybrid storage device to the second working mode.

27 Claims, 8 Drawing Sheets

(52) U.S. Cl.
CPC .............. *G06F 3/065* (2013.01); *G06F 3/068* (2013.01); *G06F 3/0625* (2013.01); *G06F 3/0653* (2013.01); *G06F 3/0685* (2013.01); *Y02D 10/154* (2018.01)

(56) References Cited

U.S. PATENT DOCUMENTS

2012/0226881 A1   9/2012   Yi
2014/0181558 A1   6/2014   Taha et al.
2015/0220135 A1   8/2015   Huang et al.

FOREIGN PATENT DOCUMENTS

| CN | 101620460 A | 1/2010 |
| CN | 102053697 A | 5/2011 |
| CN | 103491262 A | 1/2014 |
| CN | 103870209 A | 6/2014 |
| CN | 104464802 A | 3/2015 |
| CN | 104572511 A | 4/2015 |
| WO | 2014059613 A1 | 4/2014 |

OTHER PUBLICATIONS

Hur et al., "A Comprehensive Approach to DRAM Power Management," IEEE 2008, pp. 305-316, Institute of Electrical and Electronics Engineers, New York, New York (2008).

Wu et al., "RAMZzz: Rank-Aware DRAM Power Management with Dynamic Migrations and Demotions," SC12, Institute of Electrical and Electronics Engineers, New York, New York, (Nov. 10-16, 2012).

* cited by examiner

| Page | Address in a volatile storage unit | Address in a non-volatile storage unit |
|---|---|---|
| Page0 | XXXXXX | XXXXXX |
| Page1 | XXXXXX | XXXXXX |
| Page2 | XXXXXX | XXXXXX |
| ... | ... | ... |

| Page | Address in a volatile storage unit | Address in a non-volatile storage unit | Significant bit |
|---|---|---|---|
| Page0 | XXXXXX | XXXXXX | 0 |
| Page1 | XXXXXX | XXXXXX | 0 |
| Page2 | XXXXXX | XXXXXX | 1 |
| ... | ... | ... | |

FIG. 3

HYBRID STORAGE DEVICE, COMPUTER, CONTROL DEVICE, AND POWER CONSUMPTION REDUCTION METHOD

CROSS-REFERENCE TO RELATED APPLICATIONS

This application is a continuation of International Application No. PCT/CN2016/092336, filed on Jul. 29, 2016, which claims priority to Chinese Patent Application No. 201510460606.8, filed on Jul. 30, 2015. The disclosures of the aforementioned applications are hereby incorporated by reference in their entireties.

TECHNICAL FIELD

The present application relates to the field of power consumption management technologies, and in particular, to a hybrid storage device, a computer, a control device, and a power consumption reduction method.

BACKGROUND

In a current data center server, a dynamic random access memory (DRAM) is generally used as a memory of the server. However, more than 50% of power consumption of the DRAM is generated by the DRAM itself, and is referred to as background power consumption. That is, even though the DRAM is in an idle state, more than 50% of energy is consumed.

Generally, background power consumption of a DRAM includes refresh power consumption of the DRAM and power consumption of a peripheral circuit.

In a DRAM, each memory cell includes one metal oxide semiconductor (MOS) transistor and one capacitor. An external power source supplies power to each memory cell, to store data. Because an electric charge stored in the capacitor leaks through the MOS transistor after a period of time, a circuit needs to be refreshed periodically to supplement the capacitor with charges, so as to maintain the data stored in the cell.

Generally, the DRAM refreshes the circuit by using an external clock. In this way, a refresh speed is relatively fast, but relatively more power is consumed. In the prior art, to reduce power consumption, after a server enters a power saving mode, the DRAM enters a self-refreshing state. That is, the DRAM refreshes the circuit by using a clock of the DRAM, instead of using an external clock. Therefore, background power consumption generated by the DRAM may be reduced.

However, during self-refreshing, the DRAM still needs to refresh all memory banks. In addition, a peripheral circuit of the DRAM needs to be always in a working state. Therefore, even though the server is in the power saving mode, the power consumption generated by the DRAM is still relatively high.

SUMMARY

Embodiments of the present application provide a hybrid storage device, a computer, a control device, and a power consumption reduction method, to reduce power consumption generated by the hybrid storage device.

A first aspect of the embodiments of the present application provides a hybrid storage device, where the hybrid storage device includes a controller, a volatile storage unit, and a non-volatile storage unit;

the hybrid storage device is applied to a computer, and the hybrid storage device is configured as a memory unit of the computer;

the hybrid storage device has two working modes; in a first working mode, the volatile storage unit is in an enabled state and is configured to store data, and the non-volatile storage unit is in a disabled state; and in a second working mode, the non-volatile storage unit is in an enabled state and is configured to store data, and the volatile storage unit is in a disabled state; and when the hybrid storage device runs in the first working mode, the controller is configured to: monitor a running parameter of the computer; when detecting that the running parameter of the computer meets a first switching condition, enable the non-volatile storage unit, and copy data in the volatile storage unit to the non-volatile storage unit; and switch the hybrid storage device to the second working mode.

With reference to the first aspect, in a first possible implementation, the running parameter of the computer includes an access frequency of a processor of the computer and a volume of data that has been stored in the volatile storage unit;

the first switching condition includes: the access frequency of the processor of the computer is less than or equal to a first preset value, and the volume of the data that has been stored in the volatile storage unit is less than or equal to a capacity of the non-volatile storage unit; and the controller is specifically configured to copy all data that has been stored in the volatile storage unit to the non-volatile storage unit.

With reference to the first aspect, in a second possible implementation, the running parameter of the computer includes an access frequency of a processor of the computer and a volume of active data that has been stored in the volatile storage unit;

the first switching condition includes: the access frequency of the processor of the computer is less than or equal to a second preset value, and the volume of the active data that has been stored in the volatile storage unit is less than or equal to a capacity of the non-volatile storage unit; and the controller is specifically configured to copy the active data that has been stored in the volatile storage unit to the non-volatile storage unit.

With reference to the first aspect, in a third possible implementation, the first switching condition is a pre-switching condition, and the pre-switching condition is used to trigger a copy operation instead of a switching operation; and after performing the copy operation, the controller is further configured to: detect whether the running parameter of the computer meets a second switching condition, and perform the switching operation after detecting that the running parameter of the computer meets the second switching condition.

With reference to the third possible implementation of the first aspect, in a fourth possible implementation, the running parameter of the computer includes an access frequency of a processor of the computer and a volume of active data that has been stored in the volatile storage unit;

the first switching condition includes: the access frequency of the processor of the computer is less than or equal to a third preset value, and the volume of the active data that has been stored in the volatile storage unit is less than or equal to a capacity of the non-volatile storage unit; the second switching condition includes that the access frequency of the processor of the computer is less than or equal to a fourth preset value; and the fourth preset value is less than the third preset value; and the controller is specifically configured to copy the active data that has been stored in the volatile storage unit to the non-volatile storage unit.

With reference to the third or the fourth possible implementation of the first aspect, in a fifth possible implementation, before performing the switching operation, the controller is further configured to: determine whether data in the non-volatile storage unit is consistent with the data in the volatile storage unit; update the data in the non-volatile storage unit to be consistent with the data in the volatile storage unit when the data in the non-volatile storage unit is inconsistent with the data in the volatile storage unit; and switch the hybrid storage device to the second working mode after performing the update operation.

With reference to the first aspect, in a sixth possible implementation, the running parameter of the computer is a current time measured by a clock on the computer, and the first switching condition is that the current time measured by the clock on the computer meets a preset time condition; or the running parameter of the computer is a battery level of the computer, and the first switching condition is that the battery level of the computer is less than or equal to a preset battery level; or the running parameter of the computer is a control instruction entered by using an input unit of the computer, and the first switching condition is that the control instruction entered by using the input unit of the computer is a mode switching instruction.

With reference to any one of the first aspect or the first to the sixth possible implementations of the first aspect, in a seventh possible implementation, the volatile storage unit includes multiple storage subunits; and the controller is further configured to: when detecting that the access frequency of the processor of the computer is less than or equal to a fifth preset value, aggregate data dispersedly stored in the multiple storage subunits of the volatile storage unit; and disable, after the aggregation operation, a storage subunit that stores no data, where the fifth preset value is greater than each of the first preset value, the second preset value, and the third preset value.

With reference to any one of the first aspect or the first to the seventh possible implementations of the first aspect, in an eighth possible implementation, when the hybrid storage device runs in the second working mode, the controller is further configured to: monitor the running parameter of the computer; when detecting that the running parameter of the computer meets a third switching condition, enable the volatile storage unit, and copy data in the non-volatile storage unit to the volatile storage unit; and switch the hybrid storage device to the first working mode.

With reference to the eighth possible implementation of the first aspect, in a ninth possible implementation, a running parameter of the non-volatile storage unit includes the access frequency of the processor of the computer; and the third switching condition includes that the access frequency of the processor of the computer is greater than or equal to a sixth preset value.

A second aspect of the embodiments of the present application provides a computer, where the computer includes a controller and a hybrid storage device, the hybrid storage device includes a volatile storage unit and a non-volatile storage unit, and the hybrid storage device is configured as a memory unit of the computer;

the hybrid storage device has two working modes; in a first working mode, the volatile storage unit is in an enabled state and is configured to store data, and the non-volatile storage unit is in a disabled state; and in a second working mode, the non-volatile storage unit is in an enabled state and is configured to store data, and the volatile storage unit is in a disabled state; and when the hybrid storage device runs in the first working mode, the controller is configured to: monitor a running parameter of the computer; when detecting that the running parameter of the computer meets a first switching condition, enable the non-volatile storage unit, and copy data in the volatile storage unit to the non-volatile storage unit; and switch the hybrid storage device to the second working mode.

With reference to the second aspect, in a first possible implementation, the running parameter of the computer includes an access frequency of a processor of the computer and a volume of data that has been stored in the volatile storage unit;

the first switching condition includes: the access frequency of the processor of the computer is less than or equal to a first preset value, and the volume of the data that has been stored in the volatile storage unit is less than or equal to a capacity of the non-volatile storage unit; and the controller is specifically configured to copy all data that has been stored in the volatile storage unit to the non-volatile storage unit.

With reference to the second aspect, in a second possible implementation, the running parameter of the computer includes an access frequency of a processor of the computer and a volume of active data that has been stored in the volatile storage unit;

the first switching condition includes: the access frequency of the processor of the computer is less than or equal to a second preset value, and the volume of the active data that has been stored in the volatile storage unit is less than or equal to a capacity of the non-volatile storage unit; and the controller is specifically configured to copy the active data that has been stored in the volatile storage unit to the non-volatile storage unit.

With reference to the second aspect, in a third possible implementation, the first switching condition is a pre-switching condition, and the pre-switching condition is used to trigger a copy operation instead of a switching operation; and after performing the copy operation, the controller is further configured to: detect whether the running parameter of the computer meets a second switching condition, and perform the switching operation after detecting that the running parameter of the computer meets the second switching condition.

With reference to the third possible implementation of the second aspect, in a fourth possible implementation, the running parameter of the computer includes an access frequency of a processor of the computer and a volume of active data that has been stored in the volatile storage unit;

the first switching condition includes: the access frequency of the processor of the computer is less than or equal to a third preset value, and the volume of the active data that has been stored in the volatile storage unit is less than or equal to a capacity of the non-volatile storage unit; the second switching condition includes that the access frequency of the processor of the computer is less than or equal to a fourth preset value; and the fourth preset value is less than the third preset value; and the controller is specifically configured to copy the active data that has been stored in the volatile storage unit to the non-volatile storage unit.

With reference to the third or the fourth possible implementation of the second aspect, in a fifth possible implementation, before performing the switching operation, the controller is further configured to: determine whether data in the non-volatile storage unit is consistent with the data in the volatile storage unit; update the data in the non-volatile storage unit to be consistent with the data in the volatile storage unit when the data in the non-volatile storage unit is inconsistent with the data in the volatile storage unit; and switch the hybrid storage device to the second working mode after performing the update operation.

With reference to the second aspect, in a sixth possible implementation, the running parameter of the computer is a current time measured by a clock on the computer, and the first switching condition is that the current time measured by the clock on the computer meets a preset time condition; or the running parameter of the computer is a battery level of the computer, and the first switching condition is that the battery level of the computer is less than or equal to a preset battery level; or the running parameter of the computer is a control instruction entered by using an input unit of the computer, and the first switching condition is that the control instruction entered by using the input unit of the computer is a mode switching instruction.

With reference to any one of the second aspect or the first to the sixth possible implementations of the first aspect, in a seventh possible implementation, the volatile storage unit includes multiple storage subunits; and the controller is further configured to: when detecting that the access frequency of the processor of the computer is less than or equal to a fifth preset value, aggregate data dispersedly stored in the multiple storage subunits of the volatile storage unit; and disable, after the aggregation operation, a storage subunit that stores no data, where the fifth preset value is greater than each of the first preset value, the second preset value, and the third preset value.

With reference to any one of the first aspect or the first to the seventh possible implementations of the first aspect, in an eighth possible implementation, when the hybrid storage device runs in the second working mode, the controller is further configured to: monitor the running parameter of the computer; when detecting that the running parameter of the computer meets a third switching condition, enable the volatile storage unit, and copy data in the non-volatile storage unit to the volatile storage unit; and switch the hybrid storage device to the first working mode.

With reference to the eighth possible implementation of the first aspect in a ninth possible implementation, a running parameter of the non-volatile storage unit includes the access frequency of the processor of the computer; and the third switching condition includes that the access frequency of the processor of the computer is greater than or equal to a sixth preset value.

A third aspect of the embodiments of the present application provides a control device, controlling a hybrid storage device, where the hybrid storage device is configured as a memory of a computer, and the hybrid storage device includes a volatile storage unit and a non-volatile storage unit; the hybrid storage device has two working modes; in a first working mode, the volatile storage unit is in an enabled state and is configured to store data, and the non-volatile storage unit is in a disabled state; in a second working mode, the non-volatile storage unit is in an enabled state and is configured to store data, and the volatile storage unit is in a disabled state; and the control device includes:

a monitoring unit, configured to monitor a running parameter of the computer when the hybrid storage device runs in the first working mode;

a copy unit, configured to: when the monitoring unit detects that the running parameter of the computer meets a first switching condition, enable the non-volatile storage unit, and copy data in the volatile storage unit to the non-volatile storage unit; and a switching unit, configured to switch the hybrid storage device to the second working mode.

With reference to the third aspect, in a first possible implementation, the running parameter of the computer includes an access frequency of a processor of the computer and a volume of data that has been stored in the volatile storage unit;

the first switching condition includes: the access frequency of the processor of the computer is less than or equal to a first preset value, and the volume of the data that has been stored in the volatile storage unit is less than or equal to a capacity of the non-volatile storage unit; and the copy unit is specifically configured to copy all data that has been stored in the volatile storage unit to the non-volatile storage unit.

With reference to the third aspect, in a second possible implementation, the running parameter of the computer includes an access frequency of a processor of the computer and a volume of active data that has been stored in the volatile storage unit;

the first switching condition includes: the access frequency of the processor of the computer is less than or equal to a second preset value, and the volume of the active data that has been stored in the volatile storage unit is less than or equal to a capacity of the non-volatile storage unit; and the copy unit is specifically configured to copy the active data that has been stored in the volatile storage unit to the non-volatile storage unit.

With reference to the third aspect, in a third possible implementation, the first switching condition is a pre-switching condition, and the pre-switching condition is used to trigger a copy operation instead of a switching operation; and after the copy unit performs the copy operation, the monitoring unit is further configured to detect whether the running parameter of the computer meets a second switching condition, and the switching unit performs the switching operation after the monitoring unit detects that the running parameter of the computer meets the second switching condition.

With reference to the third possible implementation of the third aspect, in a fourth possible implementation, the running parameter of the computer includes an access frequency of a processor of the computer and a volume of active data that has been stored in the volatile storage unit;

the first switching condition includes: the access frequency of the processor of the computer is less than or equal to a third preset value, and the volume of the active data that has been stored in the volatile storage unit is less than or equal to a capacity of the non-volatile storage unit; the second switching condition includes that the access frequency of the processor of the computer is less than or equal to a fourth preset value; and the fourth preset value is less than the third preset value; and the copy unit is specifically configured to copy the active data that has been stored in the volatile storage unit to the non-volatile storage unit.

With reference to the third or the fourth possible implementation of the third aspect, in a fifth possible implementation, before performing the switching operation, the switching unit is further configured to: determine whether data in the non-volatile storage unit is consistent with the data in the volatile storage unit; update the data in the non-volatile storage unit to be consistent with the data in the volatile storage unit when the data in the non-volatile storage unit is inconsistent with the data in the volatile storage unit; and switch the hybrid storage device to the second working mode after performing the update operation.

With reference to the third aspect, in a sixth possible implementation, the running parameter of the computer is a current time measured by a clock on the computer, and the first switching condition is that the current time measured by the clock on the computer meets a preset time condition; or the running parameter of the computer is a battery level of the computer, and the first switching condition is that the battery level of the computer is less than or equal to a preset battery level; or the running parameter of the computer is a control instruction entered by using an input unit of the computer, and the first switching condition is that the control instruction entered by using the input unit of the computer is a mode switching instruction.

With reference to any one of the third aspect or the first to the sixth implementations of the third aspect, in a seventh possible implementation, the volatile storage unit includes multiple storage subunits, and the computer further includes an aggregation unit; and the aggregation unit is configured to: when it is detected that the access frequency of the processor of the computer is less than or equal to a fifth preset value, aggregate data dispersedly stored in the multiple storage subunits of the volatile storage unit; and disable, after the aggregation operation, a storage subunit that stores no data, where the fifth preset value is greater than each of the first preset value, the second preset value, and the third preset value.

With reference to any one of the third aspect or the first to the seventh implementations of the third aspect, in an eighth possible implementation, when the hybrid storage device runs in the second working mode, the monitoring unit is further configured to monitor the running parameter of the computer; when it is detected that the running parameter of the computer meets a third switching condition, the copy unit enables the volatile storage unit, and copies data in the non-volatile storage unit to the volatile storage unit; and the switching unit switches the hybrid storage device to the first working mode.

With reference to the eighth possible implementation of the third aspect, in a ninth possible implementation, a running parameter of the non-volatile storage unit includes the access frequency of the processor of the computer; and the third switching condition includes that the access frequency of the processor of the computer is greater than or equal to a sixth preset value.

A fourth aspect of the embodiments of the present application provides a power consumption reduction method, used to reduce power consumption of a hybrid storage device, where the hybrid storage device is configured as a memory of a computer and includes a volatile storage unit and a non-volatile storage unit; the hybrid storage device has two working modes; in a first working mode, the volatile storage unit is in an enabled state and is configured to store data, and the non-volatile storage unit is in a disabled state; in a second working mode, the non-volatile storage unit is in an enabled state and is configured to store data, and the volatile storage unit is in a disabled state; and the method includes:

monitoring a running parameter of the computer when the hybrid storage device runs in the first working mode;

when it is detected that the running parameter of the computer meets a first switching condition, enabling the non-volatile storage unit, and copying data in the volatile storage unit to the non-volatile storage unit; and switching the hybrid storage device to the second working mode.

With reference to the fourth aspect, in a first possible implementation, the running parameter of the computer includes an access frequency of a processor of the computer and a volume of data that has been stored in the volatile storage unit;

the first switching condition includes: the access frequency of the processor of the computer is less than or equal to a first preset value, and the volume of the data that has been stored in the volatile storage unit is less than or equal to a capacity of the non-volatile storage unit; and the copying data in the volatile storage unit to the non-volatile storage unit is specifically: copying all data that has been stored in the volatile storage unit to the non-volatile storage unit.

With reference to the fourth aspect, in a second possible implementation, the running parameter of the computer includes an access frequency of a processor of the computer and a volume of active data that has been stored in the volatile storage unit;

the first switching condition includes: the access frequency of the processor of the computer is less than or equal to a second preset value, and the volume of the active data that has been stored in the volatile storage unit is less than or equal to a capacity of the non-volatile storage unit; and the copying data in the volatile storage unit to the non-volatile storage unit is specifically: copying the active data that has been stored in the volatile storage unit to the non-volatile storage unit.

With reference to the fourth aspect, in a third possible implementation, the first switching condition is a pre-switching condition, and the pre-switching condition is used to trigger a copy operation instead of a switching operation; and after the copy operation is performed, the method further includes:

monitoring whether the running parameter of the computer meets a second switching condition, and performing the switching operation after it is detected that the running parameter of the computer meets the second switching condition.

With reference to the third implementation of the fourth aspect, in a fourth possible implementation, the running parameter of the computer includes an access frequency of a processor of the computer and a volume of active data that has been stored in the volatile storage unit;

the first switching condition includes: the access frequency of the processor of the computer is less than or equal to a third preset value, and the volume of the active data that has been stored in the volatile storage unit is less than or equal to a capacity of the non-volatile storage unit; the second switching condition includes that the access frequency of the processor of the computer is less than or equal to a fourth preset value; and the fourth preset value is less than the third preset value; and the copying data in the volatile storage unit to the non-volatile storage unit is specifically:

copying the active data that has been stored in the volatile storage unit to the non-volatile storage unit.

With reference to the third or the fourth implementation of the fourth aspect, in a fifth possible implementation, before the switching operation is performed, the method further includes:

determining whether data in the non-volatile storage unit is consistent with the data in the volatile storage unit; and updating the data in the non-volatile storage unit to be consistent with the data in the volatile storage unit when the data in the non-volatile storage unit is inconsistent with the data in the volatile storage unit; and switching the hybrid storage device to the second working mode after the update operation is performed.

With reference to the fourth aspect, in a sixth possible implementation, the running parameter of the computer includes a current time measured by a clock on the computer, or a battery level of the computer, or a control instruction entered by using an input unit of the computer; and the first switching condition includes: the current time measured by the clock on the computer meets a preset time condition; or the battery level of the computer is less than or equal to a preset battery level; or the control instruction entered by using the input unit of the computer is a mode switching instruction.

With reference to any one of the fourth aspect or the first to the sixth implementations of the fourth aspect, in a seventh possible implementation, the volatile storage unit includes multiple storage subunits; and the method further includes:

when it is detected that the access frequency of the processor of the computer is less than or equal to a fifth preset value, aggregating data dispersedly stored in the multiple storage subunits of the volatile storage unit; and disabling, after the aggregation operation, a storage subunit that stores no data, where the fifth preset value is greater than each of the first preset value, the second preset value, and the third preset value.

With reference to any one of the fourth aspect or the first to the seventh implementations of the fourth aspect, in an eighth possible implementation, when the hybrid storage device runs in the second working mode, the method further includes:

monitoring the running parameter of the computer; and when it is detected that the running parameter of the computer meets a third switching condition, enabling the volatile storage unit, and copying data in the non-volatile storage unit to the volatile storage unit; and switching the hybrid storage device to the first working mode.

With reference to the eighth possible implementation of the fourth aspect, in a ninth possible implementation, a running parameter of the non-volatile storage unit includes the access frequency of the processor of the computer; and the third switching condition includes that the access frequency of the processor of the computer is greater than or equal to a sixth preset value.

A fifth aspect of the present application provides a computer, where the computer includes a processor, a hybrid storage device, a communications bus, and a communications interface; the hybrid storage device is configured to store a computer execution instruction; the processor and the hybrid storage device are connected by using the bus; the hybrid storage device is used as a memory of the computer and includes a volatile storage unit and a non-volatile storage unit; the hybrid storage device has two working modes; in a first working mode, the volatile storage unit is in an enabled state and is configured to store data, and the non-volatile storage unit is in a disabled state; and in a second working mode, the non-volatile storage unit is in an enabled state and is configured to store data, and the volatile storage unit is in a disabled state; and when the storage device runs, the processor executes the computer execution instruction stored in the instruction memory, to enable the storage device to execute the following method:

monitoring a running parameter of the computer when the hybrid storage device runs in the first working mode;

when it is detected that the running parameter of the computer meets a first switching condition, enabling the non-volatile storage unit, and copying data in the volatile storage unit to the non-volatile storage unit; and switching the hybrid storage device to the second working mode.

The embodiments of the present application provide a hybrid storage device including a volatile storage unit and a non-volatile storage unit. Two working modes are set for the hybrid storage device. In a first working mode, the volatile storage unit is in an enabled state and is configured to store data, and the non-volatile storage unit is in a disabled state; in a second working mode, the non-volatile storage unit is in an enabled state and is configured to store data, and the volatile storage unit is in a disabled state. When the hybrid storage device runs in the first working mode, if it is detected that a running parameter of a computer meets a first switching condition, for example, an access frequency of a processor of the computer is less than or equal to an access frequency of the processor of the computer and a volume of data that has been stored in the volatile storage unit is less than or equal to a capacity of the non-volatile storage unit, the non-volatile storage unit is enabled, the data in the volatile storage unit is copied to the non-volatile storage unit, and the volatile storage unit is disabled. Therefore, when the computer is relatively idle, the volatile storage unit that consumes more power may be disabled, and data is stored in the non-volatile storage unit consuming low power, thereby effectively reducing power consumption generated by the volatile storage unit.

BRIEF DESCRIPTION OF DRAWINGS

To describe technical solutions in embodiments of the present application more clearly, the following briefly describes the accompanying drawings.

FIG. 3 is a schematic diagram of another page table in the hybrid storage device in FIG. 1;

DESCRIPTION OF EMBODIMENTS

The following clearly describes technical solutions in embodiments of the present application with reference to the accompanying drawings.

A volatile memory such as a dynamic random access memory (DRAM) needs to constantly refresh a circuit to save data during working, and a peripheral circuit also needs to consume electric energy. Therefore, relatively high background power consumption is generated provided that the DRAM is in a working state. Therefore, the embodiments of the present application provide a hybrid storage device. The hybrid storage device includes the DRAM and a non-volatile memory (NVM) consuming relatively low power. When a computer needs to reduce power consumption, for example, when an access frequency of a processor of the computer is relatively low, data in the DRAM is copied to the NVM, and then the DRAM is disabled. In this way, the computer runs by using the NVM consuming relatively low power, thereby reducing the background power consumption generated by the DRAM.

The technical solutions provided in the present application are described below by using specific embodiments.

Figures 1, 2:
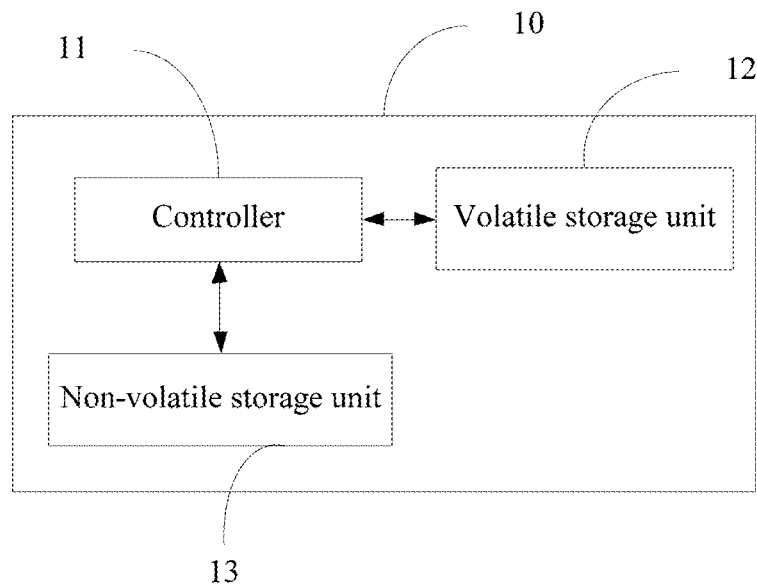
FIG. 1 is a structural diagram of a hybrid storage device according to an embodiment of the present application.
FIG. 2 is a schematic diagram of a page table in the hybrid storage device in FIG. 1.

As shown in FIG. 1, FIG. 1 is a structural diagram of a hybrid storage device according to an embodiment of the present application. The hybrid storage device 10 includes a controller 11, a volatile storage unit 12, and a non-volatile storage unit 13. The hybrid storage device is mainly applied to a computer (not shown in the figure). The hybrid storage device 10 has two working modes. In a first working mode, the volatile storage unit 12 is in an enabled state and is configured to store data, and the non-volatile storage unit 13 is in a disabled state. In a second working mode, the non-volatile storage unit 13 is in an enabled state and is configured to store data, and the volatile storage unit 12 is in a disabled state. When the hybrid storage device 10 runs in the first working mode, the controller 11 is configured to: monitor a running parameter of the computer; when detecting that the running parameter of the computer meets a first switching condition, enable the non-volatile storage unit 13, and copy data in the volatile storage unit 12 to the non-volatile storage unit 13; and switch the hybrid storage device 10 to the second working mode.

The volatile storage unit 12 and the non-volatile storage unit 13 are used as memories of the computer. The controller 11 is a memory controller, and is configured to control access to data in the volatile storage unit 12 and the non-volatile storage unit 13 and switching between the two modes corresponding to the volatile storage unit 12 and the non-volatile storage unit 13.

The computer is a server or a mobile terminal, for example, a mobile phone. The volatile storage unit 12 is a DRAM and has a faster access speed, but consumes higher power. The non-volatile storage unit 13 is a phase change memory (PCM) and consumes lower power, but has a slower access speed. Therefore, when the hybrid storage device is in the first working mode, the computer consumes higher power and has a faster access speed; when the hybrid storage device is in the second working mode, the computer consumes lower power and has a slower access speed.

When the data in the volatile storage unit 12 is copied to the non-volatile storage unit 13, addresses, in the volatile storage unit 12 and the non-volatile storage unit 13, of each page of copied data are recorded in a page table shown in FIG. 2. In this way, after the data is copied to the non-volatile storage unit 13, the controller 11 may find, according to an address of accessed data in the volatile storage unit 12, a storage location of a page of the data in the non-volatile storage unit 13. Therefore, after the data in the volatile storage unit 12 is copied to the non-volatile storage unit 13, an accessed page may still be normally accessed.

Based on the hybrid storage device provided in this embodiment, in a first implementation, the running parameter of the computer includes an access frequency of a processor of the computer and a volume of data that has been stored in the volatile storage unit 12. The first switching condition includes: the access frequency of the processor of the computer is less than or equal to a first preset value, and the volume of the data that has been stored in the volatile storage unit 12 is less than or equal to a capacity of the non-volatile storage unit 13. The controller 11 is specifically configured to copy all data that has been stored in the volatile storage unit 12 to the non-volatile storage unit 13.

In an application scenario of the first implementation, when the access frequency of the processor of the computer is relatively low, for example, in a standby state of the computer or in the evening when the computer is not used, and when some small applications run in the volatile storage unit 12 and a total volume of data of the small applications is less than the capacity of the non-volatile storage unit 13, all the data of the small applications running in the volatile storage unit 12 may be copied to the non-volatile storage unit 13, thereby running the small applications in the non-volatile storage unit 13. In this way, after the volatile storage unit 12 is disabled, background power consumption generated by the volatile storage unit 12 is reduced, but a hit ratio of the hybrid storage device 10 is not reduced.

Based on the hybrid storage device provided in this embodiment, in a second implementation, the running parameter of the computer includes an access frequency of a processor of the computer and a volume of active data that has been stored in the volatile storage unit. The first switching condition includes: the access frequency of the processor of the computer is less than or equal to a second preset value, and the volume of the active data that has been stored in the volatile storage unit is less than or equal to a capacity of the non-volatile storage unit. The controller is specifically configured to copy the active data that has been stored in the volatile storage unit to the non-volatile storage unit. The active data is data accessed within a preset time interval.

In an application scenario of the second implementation, when the volatile storage unit 12 has a relatively large volume of operation data, even though the access frequency of the processor of the computer is less than or equal to the second preset value, not all the data in the volatile storage unit 12 can be copied to the non-volatile storage unit 13 because the capacity of the non-volatile storage unit 13 is relatively small. In this case, active data that is frequently accessed needs to be selected and copied, and active data is copied only when a data volume of the active data is less than the capacity of the non-volatile memory. In a practical application, when detecting that the access frequency of the processor of the computer is less than or equal to the second preset value, the controller monitors the data volume of the active data; and continue to perform monitoring when the data volume of the active data is greater than the capacity of the non-volatile storage unit 13. When the data volume of the active data is less than the capacity of the non-volatile storage unit 13, an operation of copying data is triggered.

Based on the hybrid storage device provided in this embodiment, in a third implementation, the first switching condition is a pre-switching condition, and the pre-switching condition is used to trigger a copy operation instead of a switching operation. After performing the copy operation, the controller 11 is further configured to: detect whether the running parameter of the computer meets a second switching condition, and perform the switching operation after detecting that the running parameter of the computer meets the second switching condition.

The running parameter of the computer includes an access frequency of a processor of the computer and a volume of active data that has been stored in the volatile storage unit 12. The first switching condition includes: the access frequency of the processor of the computer is less than or equal to a third preset value, and the volume of the active data that has been stored in the volatile storage unit 12 is less than or equal to a capacity of the non-volatile storage unit 13. The second switching condition includes that the access frequency of the processor of the computer is less than or equal to a fourth preset value. The fourth preset value is less than the third preset value. The controller 11 is specifically configured to copy the active data that has been stored in the volatile storage unit 12 to the non-volatile storage unit 13.

In an application scenario of the third implementation, when detecting the first switching condition, instead of immediately switching the hybrid storage device 10 to the second working mode, the controller 11 allows the hybrid storage device 10 to continue working in the first working mode, and copies the data that needs to be copied in the volatile storage unit 12 to the non-volatile storage unit 13. Subsequently, if the controller 11 detects that the running parameter of the computer meets the second switching condition, that is, the access frequency of the processor of the computer is less than or equal to the fourth preset value, the controller 11 switches the hybrid storage device 10 to the second working mode, that is, disables the volatile storage unit 12. In this way, after the running parameter of the computer meets the second switching condition, the hybrid storage device 10 immediately enters the second working mode without waiting for a data copy process.

In the third implementation, before performing the switching operation, the controller 11 is further configured to: determine whether data in the non-volatile storage unit 13 is consistent with the data in the volatile storage unit 12; update the data in the non-volatile storage unit 13 to be consistent with the data in the volatile storage unit 12 when the data in the non-volatile storage unit 13 is inconsistent with the data in the volatile storage unit 12; and switch the hybrid storage device 10 to the second working mode after performing the update operation.

A specific implementation is shown in FIG. 3. A tag field is added to the page table shown in FIG. 2. When data in the volatile storage unit 12 is to be copied to the non-volatile storage unit 13, a tag field for each page of data in the page table is initialized to 0. After the data in the volatile storage unit 12 is updated, a tag field for an updated data page is set to 1. In this case, when detecting that the running parameter of the computer meets the second switching condition, the controller copies the data page whose tag field is 1 to a corresponding location in the non-volatile storage unit 13.

In a fourth implementation, the volatile storage unit 12 includes multiple storage subunits (not shown in the figure). When the volatile storage unit 12 is a DRAM, the storage subunits are ranks of the DRAM.

In this implementation, the controller 11 is further configured to: when detecting that the access frequency of the processor of the computer is less than or equal to a fifth preset value, aggregate data dispersedly stored in the multiple storage subunits of the volatile storage unit 12; and disable, after the aggregation operation, a storage subunit that stores no data. The fifth preset value is greater than each of the first preset value, the second preset value, and the third preset value. In this way, before the hybrid storage device enters the second working mode, background power consumption generated by the volatile storage unit can be reduced.

In the foregoing implementations, before the volatile storage unit 12 is disabled, data that is in the volatile storage unit 12 and that is not copied to the non-volatile storage unit 13 may be written back to a hard disk drive (not shown in the figure) of the computer.

In addition, this embodiment of the present application further provides a fifth implementation of the hybrid storage device 10. Based on the fourth implementation, after the controller 11 aggregates the data dispersedly stored in the multiple storage subunits of the volatile storage unit 12 and disables the storage subunit that stores no data, the controller 11 monitors a storage subunit including active data. The running parameter of the computer includes an access frequency of a processor of the computer and a volume of data stored in the storage subunit including the active data. The first switching condition includes: the access frequency of the processor of the computer is less than or equal to the second preset value, and the volume of the data in the storage subunit including the active data is less than or equal to the capacity of the non-volatile storage unit. The controller 11 is specifically configured to copy the data in the volatile storage unit 12 to the non-volatile storage unit 13.

Figure 4:
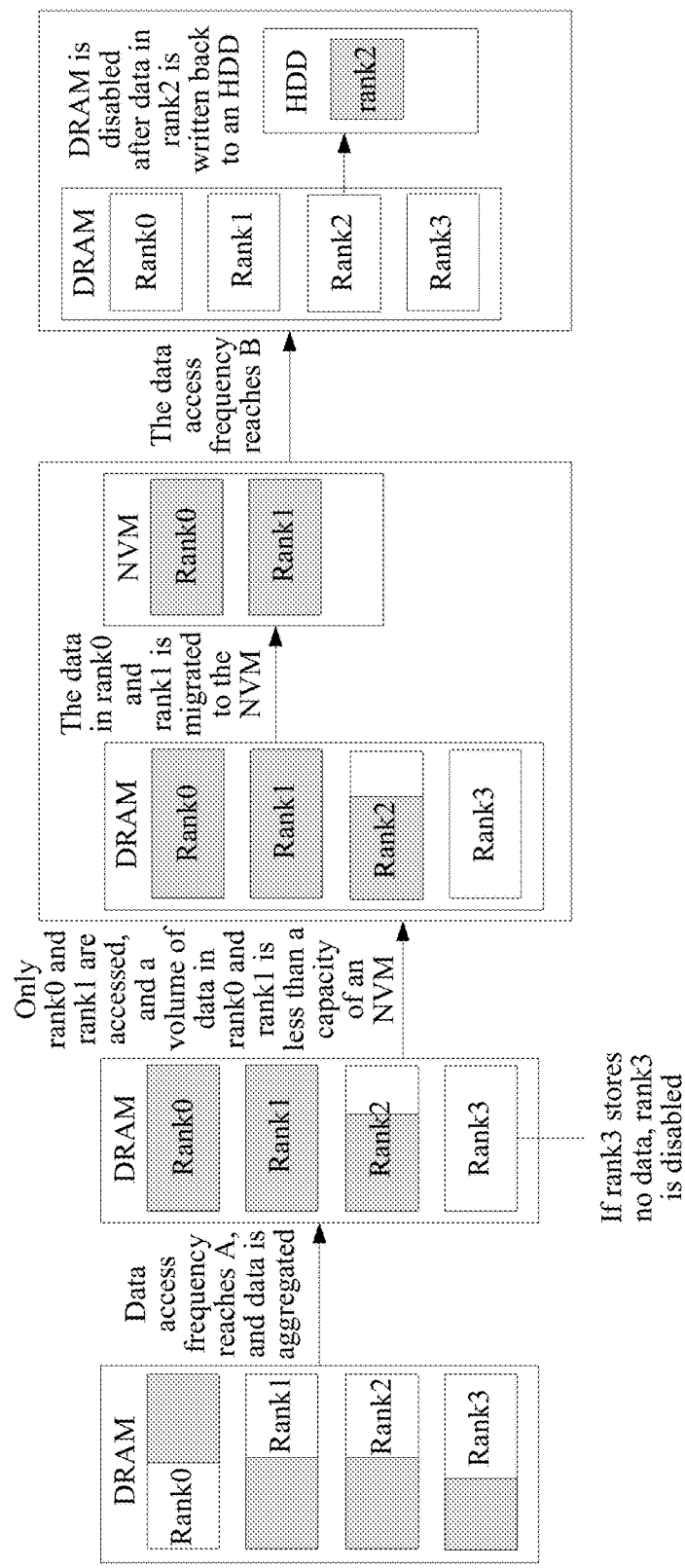
FIG. 4 is a schematic diagram of an application example of a hybrid storage device according to an embodiment of the present application.

FIG. 4 is a schematic diagram of an application example according to this embodiment of the present application. In the application example, the volatile storage unit 12 is a DRAM, the non-volatile storage unit 13 is a RAM, and the volatile storage unit 12 includes rank0, rank1, rank2, and rank3. When the controller 11 detects that the data access frequency reaches the first preset value, namely, A, the controller 11 aggregates data scattered in rank0, rank1, rank2, and rank3 into rank0, rank1, and rank2. In this case, rank3 stores no data, and rank3 may be disabled to reduce power consumption. When the controller 11 detects that a data volume of active data in rank0 and rank1 is less than the capacity of the RAM, the controller 11 copies the active data in rank0 and rank1 to the RAM. When detecting that the access frequency of data in the DRAM decreases to the second preset value, namely, B, the controller 11 writes data in rank2 back to a hard disk drive (HDD), disables the DRAM, and uses the NVM to access and store data.

In addition to the foregoing several implementations, in another implementation, the running parameter of the computer may alternatively be a current time measured by a clock on the computer, and the first switching condition is that the current time measured by the clock on the computer meets a preset time condition. In this way, it may be set that the hybrid storage device is in the first working mode during daytime, to meet a requirement of a user for high performance of the computer; and that the hybrid storage device is in the second working mode in the evening, to reduce background power consumption generated by the volatile storage unit 12.

Alternatively, the running parameter of the computer is a battery level of the computer, and the first switching condition is that the battery level of the computer is less than or equal to a preset battery level. In this way, when the battery level of the computer is relatively high, the hybrid storage device is in the first working mode, to meet a requirement of a user for high performance of the computer; when the battery level of the computer is relatively low, the hybrid storage device is in the second working mode, to reduce background power consumption generated by the non-volatile memory 13. Therefore, a time in which the computer can be used is prolonged when power cannot be supplemented in a timely manner.

Alternatively, the running parameter of the computer is a control instruction entered by using an input unit of the computer, and the first switching condition is that the control instruction entered by using the input unit of the computer is a mode switching instruction. In this way, the controller 11 may respond to a control instruction entered by a user, and allow the hybrid storage device to enter different modes according to the control instruction of the user. For example, the user may enter a control instruction when the user wants to reduce power consumption of the computer, to allow the hybrid storage device to enter the second working mode, so as to reduce the background power consumption generated by the volatile storage unit 12.

According to this embodiment, when the running parameter of the computer meets a preset condition, data is copied to the non-volatile storage unit, the volatile storage unit is disabled, and the non-volatile storage unit is used to access and store data, thereby effectively reducing the background power consumption generated by the volatile storage unit.

In this embodiment, when the hybrid storage device 10 runs in the second working mode, the controller 11 is configured to: monitor the running parameter of the computer; when detecting that the running parameter of the computer meets a third switching condition, enable the volatile storage unit 12, and copy data in the non-volatile storage unit 13 to the volatile storage unit 12; and switch the hybrid storage device 10 to the first working mode.

A running parameter of the non-volatile storage unit 12 includes the access frequency of the processor of the computer. The third switching condition includes that the access frequency of the processor of the computer is greater than or equal to a sixth preset value.

Therefore, when the computer needs to efficiently access data in the hybrid storage device, the volatile storage unit 12 may be enabled, and data is transferred back to the volatile storage unit 12, so as to meet a requirement of the user for high-performance access to the data.

Figure 5:
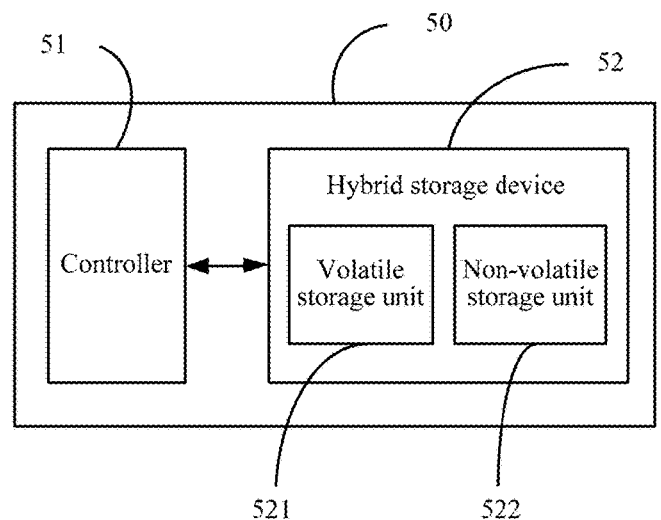
FIG. 5 is a structural diagram of a computer according to an embodiment of the present application.

As shown in FIG. 5, an embodiment of the present application further provides a computer 50. The computer 50 includes a controller 51 and a hybrid storage device 52. The hybrid storage device 52 includes a volatile storage unit 521 and a non-volatile storage unit 522. The hybrid storage device is configured as a memory unit of the computer 50. The hybrid storage device has two working modes. In a first working mode, the volatile storage unit 521 is in an enabled state and is configured to store data, and the non-volatile storage unit 522 is in a disabled state. In a second working mode, the non-volatile storage unit 522 is in an enabled state and is configured to store data, and the volatile storage unit 521 is in a disabled state. Functions executed by the controller 51 are the same as functions executed by the controller 11 in the hybrid storage device 10. A difference lies only in that the controller 51 is a controller of the computer 50, for example, a processor of the computer, and the controller 11 is a memory controller of the hybrid storage device.

Figure 6:
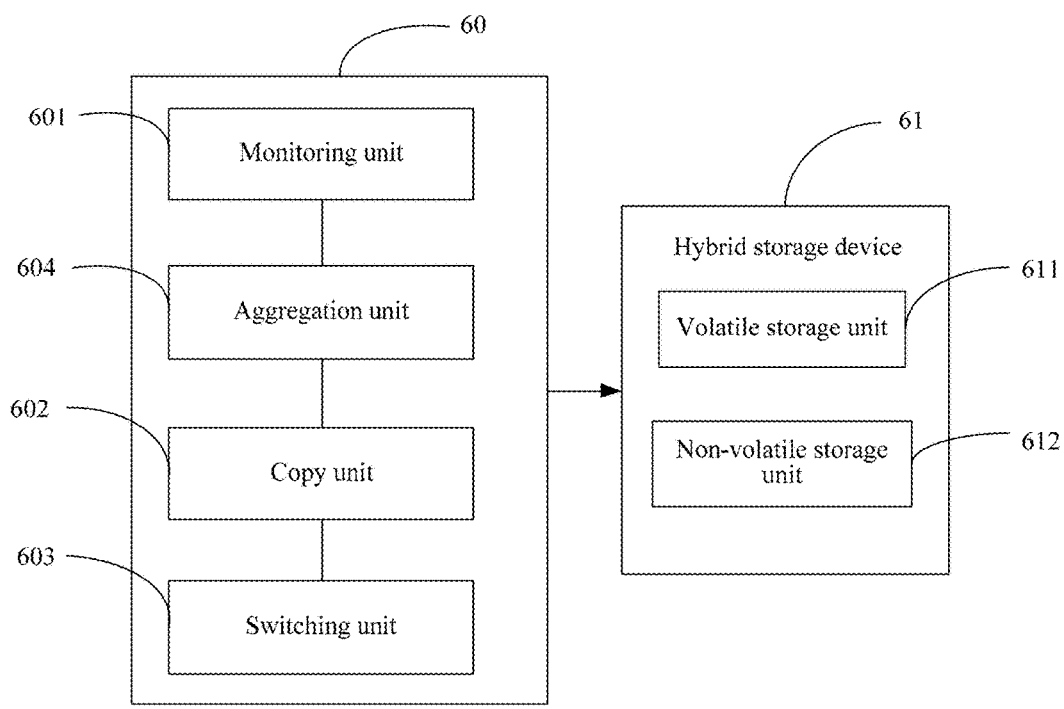
FIG. 6 is a block diagram of a control device according to an embodiment of the present application.

As shown in FIG. 6, FIG. 6 is a block diagram of a control device 60 according to an embodiment of the present application. The control device 60 is configured to control a hybrid storage device 61. The hybrid storage device 61 is configured as a memory of a computer, and the hybrid storage device 61 includes a volatile storage unit 611 and a non-volatile storage unit 612. The hybrid storage device 61 has two working modes. In a first working mode, the volatile storage unit 611 is in an enabled state and is configured to store data, and the non-volatile storage unit 612 is in a disabled state. In a second working mode, the non-volatile storage unit 612 is in an enabled state and is configured to store data, and the volatile storage unit 611 is in a disabled state.

The control device 60 includes a monitoring unit 601, a copy unit 602, and a switching unit 603. The monitoring unit 601 is configured to monitor a running parameter of the computer when the hybrid storage device 61 runs in the first working mode. The copy unit 602 is configured to: when the monitoring unit 601 detects that the running parameter of the computer meets a first switching condition, enable the non-volatile storage unit 612, and copy data in the volatile storage unit 611 to the non-volatile storage unit 612. The switching unit 603 is configured to switch the hybrid storage device 61 to the second working mode.

Based on the control device 60 provided in this embodiment, in a first implementation, the running parameter of the computer includes an access frequency of a processor of the computer and a volume of data that has been stored in the volatile storage unit. The first switching condition includes: the access frequency of the processor of the computer is less than or equal to a first preset value, and the volume of the data that has been stored in the volatile storage unit 611 is less than or equal to a capacity of the non-volatile storage unit 612. The copy unit is specifically configured to copy all data that has been stored in the volatile storage unit 611 to the non-volatile storage unit 612.

Based on the control device 60 provided in this embodiment, in a second implementation, the running parameter of the computer includes an access frequency of a processor of the computer and a volume of active data that has been stored in the volatile storage unit 611. The first switching condition includes: the access frequency of the processor of the computer is less than or equal to a second preset value, and the volume of the active data that has been stored in the volatile storage unit 611 is less than or equal to a capacity of the non-volatile storage unit 612. The copy unit 602 is specifically configured to copy the active data that has been stored in the volatile storage unit 611 to the non-volatile storage unit 612.

Based on the control device 60 provided in this embodiment, in a third implementation, the first switching condition is a pre-switching condition, and the pre-switching condition is used to trigger a copy operation instead of a switching operation.

After performing the copy operation, the monitoring unit 601 is further configured to: detect whether the running parameter of the computer meets a second switching condition, and perform the switching operation after detecting that the running parameter of the computer meets the second switching condition.

The running parameter of the computer includes an access frequency of a processor of the computer and a volume of active data that has been stored in the volatile storage unit.

The first switching condition includes: the access frequency of the processor of the computer is less than or equal to a third preset value, and the volume of the active data that has been stored in the volatile storage unit 611 is less than or equal to a capacity of the non-volatile storage unit 612. The second switching condition includes that the access frequency of the processor of the computer is less than or equal to a fourth preset value. The fourth preset value is less than the third preset value. The copy unit 602 is specifically configured to copy the active data that has been stored in the volatile storage unit 611 to the non-volatile storage unit 612.

In the third implementation, before performing the switching operation, the switching unit 603 is further configured to: determine whether data in the non-volatile storage unit 612 is consistent with the data in the volatile storage unit 611; update the data in the non-volatile storage unit 612 to be consistent with the data in the volatile storage unit 611 when the data in the non-volatile storage unit 612 is inconsistent with the data in the volatile storage unit 611; and switch the hybrid storage device 61 to the second working mode after performing the update operation.

In a fourth implementation, the volatile storage unit 611 includes multiple storage subunits (not shown in the figure). When the volatile storage unit 611 is a DRAM, the storage subunits are ranks of the DRAM.

In this implementation, the control device further includes an aggregation unit 604. The aggregation unit 604 is further configured to: when the monitoring unit 601 detects that the access frequency of the processor of the computer is less than or equal to a fifth preset value, aggregate data dispersedly stored in the multiple storage subunits of the volatile storage unit 611; and disable, after the aggregation operation, a storage subunit that stores no data. The fifth preset value is greater than each of the first preset value, the second preset value, and the third preset value. In this way, before the hybrid storage device 61 enters the second working mode, background power consumption generated by the volatile storage unit 611 can be reduced.

In the foregoing implementations, before the volatile storage unit 611 is disabled, data that is not copied to the non-volatile storage unit 612 may be written back to a hard disk drive (not shown in the figure) of the computer.

In addition, this embodiment of the present application further provides a fifth implementation of the control device. Based on the fourth implementation, after the aggregation unit 604 aggregates the data dispersedly stored in the multiple storage subunits of the volatile storage unit 611 and disables the storage subunit that stores no data, the monitoring unit 601 is further configured to monitor a storage subunit including active data. The running parameter of the computer includes an access frequency of a processor of the computer and a volume of data stored in the storage subunit including the active data. The first switching condition includes: the access frequency of the processor of the computer is less than or equal to the second preset value, and the volume of the data in the storage subunit including the active data is less than or equal to a data volume in the non-volatile storage unit. The copy unit 602 is specifically configured to copy the data in the volatile storage unit 611 to the non-volatile storage unit 612.

In addition to the foregoing several implementations, in another implementation, the running parameter of the computer may alternatively be a current time measured by a clock on the computer, and the first switching condition is that the current time measured by the clock on the computer meets a preset time condition. In this way, it may be set that the hybrid storage device is in the first working mode during daytime, to meet a requirement of a user for high performance of the computer; and that the hybrid storage device is in the second working mode in the evening, to reduce background power consumption generated by the volatile storage unit 611.

Alternatively, the running parameter of the computer is a battery level of the computer, and the first switching condition is that the battery level of the computer is less than or equal to a preset battery level. In this way, when the battery level of the computer is relatively high, the hybrid storage device is in the first working mode, to meet a requirement of a user for high performance of the computer; when the battery level of the computer is relatively low, the hybrid storage device is in the second working mode, to reduce background power consumption generated by the non-volatile memory 13. Therefore, a time in which the computer can be used is prolonged when power cannot be supplemented in a timely manner.

Alternatively, the running parameter of the computer is a control instruction entered by using an input unit of the computer, and the first switching condition is that the control instruction entered by using the input unit of the computer is a mode switching instruction. In this way, the monitoring unit 601 may monitor a control instruction entered by a user, and allow the hybrid storage device 61 to enter different modes according to the control instruction of the user. For example, the user may enter a control instruction when the user wants to reduce power consumption of the computer, to allow the hybrid storage device to enter the second working mode, so as to reduce the background power consumption generated by the volatile storage unit 611.

According to this embodiment, when the running parameter of the computer meets a preset condition, data is copied to the non-volatile storage unit 612, and the volatile storage unit 611 is disabled, thereby effectively reducing the background power consumption generated by the volatile storage unit 611.

In this embodiment, when the hybrid storage device 61 runs in the second working mode, the monitoring unit 601 is configured to: monitor the running parameter of the computer, and enable the volatile storage unit 611 when detecting that the running parameter of the computer meets a third switching condition. The copy unit 602 copies data in the non-volatile storage unit 612 to the volatile storage unit 611. The switching unit 603 switches the hybrid storage device 61 to the first working mode.

A running parameter of the non-volatile storage unit 612 includes the access frequency of the processor of the computer. The third switching condition includes that the access frequency of the processor of the computer is greater than or equal to a sixth preset value.

Therefore, when the computer needs to efficiently access data in the hybrid storage device, the volatile storage unit 611 may be enabled, and data is transferred back to the volatile storage unit 611, so as to meet a requirement of the user for high-performance access to the data.

Figure 7:
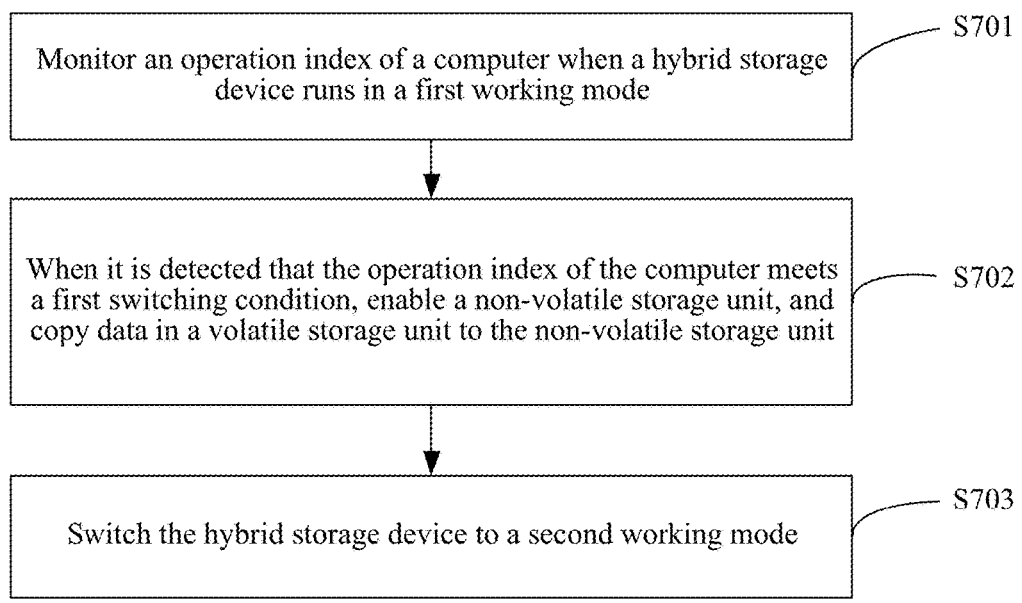
FIG. 7 is a flowchart of a first power consumption reduction method according to an embodiment of the present application.

As shown in FIG. 7, FIG. 7 is a flowchart of a first method for reducing power consumption of a hybrid storage device according to an embodiment of the present application. The hybrid storage device includes a volatile storage unit and a non-volatile storage unit. The hybrid storage device has two working modes. In a first working mode, the volatile storage unit is in an enabled state and is configured to store data, and the non-volatile storage unit is in a disabled state. In a second working mode, the non-volatile storage unit is in an enabled state and is configured to store data, and the volatile storage unit is in a disabled state. The method includes the following steps:

Step S701: Monitor a running parameter of a computer when the hybrid storage device runs in the first working mode.

Step S702: When it is detected that the running parameter of the computer meets a first switching condition, enable the non-volatile storage unit, and copy data in the volatile storage unit to the non-volatile storage unit.

Step S703: Switch the hybrid storage device to the second working mode.

In a first implementation of the method, the running parameter of the computer includes an access frequency of a processor of the computer and a volume of data that has been stored in the volatile storage unit.

The first switching condition includes: the access frequency of the processor of the computer is less than or equal to a first preset value, and the volume of the data that has been stored in the volatile storage unit is less than or equal to a capacity of the non-volatile storage unit.

The copying data in the volatile storage unit to the non-volatile storage unit is specifically: copying all data that has been stored in the volatile storage unit to the non-volatile storage unit.

In a second implementation of the method, the running parameter of the computer includes an access frequency of a processor of the computer and a volume of active data that has been stored in the volatile storage unit.

The first switching condition includes: the access frequency of the processor of the computer is less than or equal to a second preset value, and the volume of the active data that has been stored in the volatile storage unit is less than or equal to a capacity of the non-volatile storage unit.

The copying data in the volatile storage unit to the non-volatile storage unit is specifically: copying the active data that has been stored in the volatile storage unit to the non-volatile storage unit.

Figure 8:
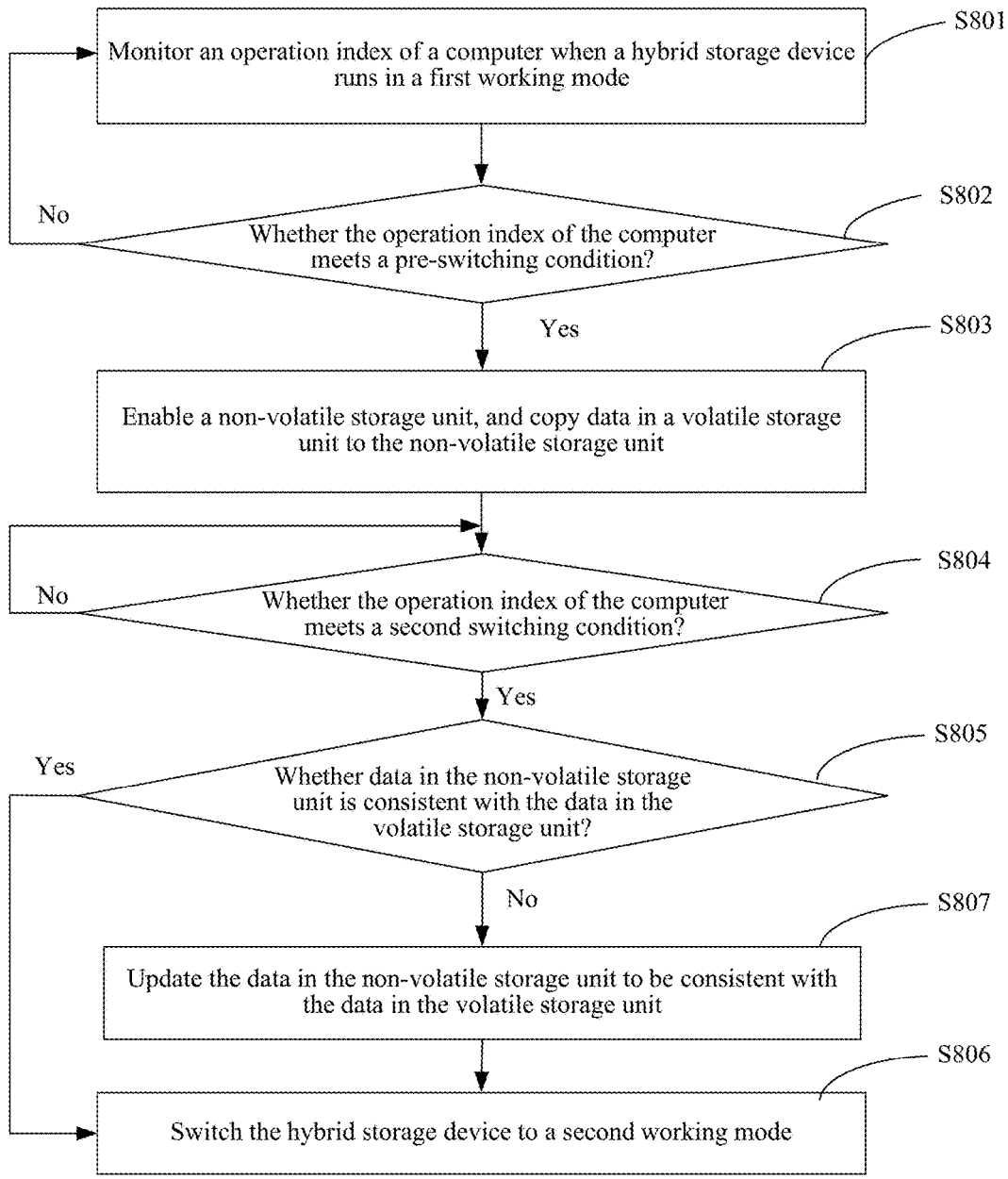
FIG. 8 is a flowchart of a second power consumption reduction method according to an embodiment of the present application.

As shown in FIG. 8, FIG. 8 is a flowchart of a second method for reducing power consumption of a hybrid storage device according to an embodiment of the present application. A structure of the hybrid storage device is the same as that of the hybrid storage device in the first method. Details are not described herein again. The method includes the following steps:

Step S801: Monitor a running parameter of a computer when the hybrid storage device runs in a first working mode.

Step S802: Determine whether the monitored running parameter of the computer meets a pre-switching condition. If the monitored running parameter of the computer meets the pre-switching condition, step S803 is performed; if the monitored running parameter of the computer does not meet the pre-switching condition, step S801 is returned to.

Step S803: Enable the non-volatile storage unit, and copy data in a volatile storage unit to a non-volatile storage unit.

Step S804: Determine whether the monitored running parameter of the computer meets a second switching condition. If the monitored running parameter of the computer meets the second switching condition, step S805 is performed; if the monitored running parameter of the computer does not meet the second switching condition, step S804 is still performed.

Step S805: Determine whether data in the non-volatile storage unit is consistent with the data in the volatile storage unit. If the two are consistent, step S806 is performed; if the two are inconsistent, step S807 is performed.

Step S806: Switch the hybrid storage device to a second working mode.

Step S807: Update the data in the non-volatile storage unit to be consistent with the data in the volatile storage unit. Then, step S806 is performed.

Figure 9:
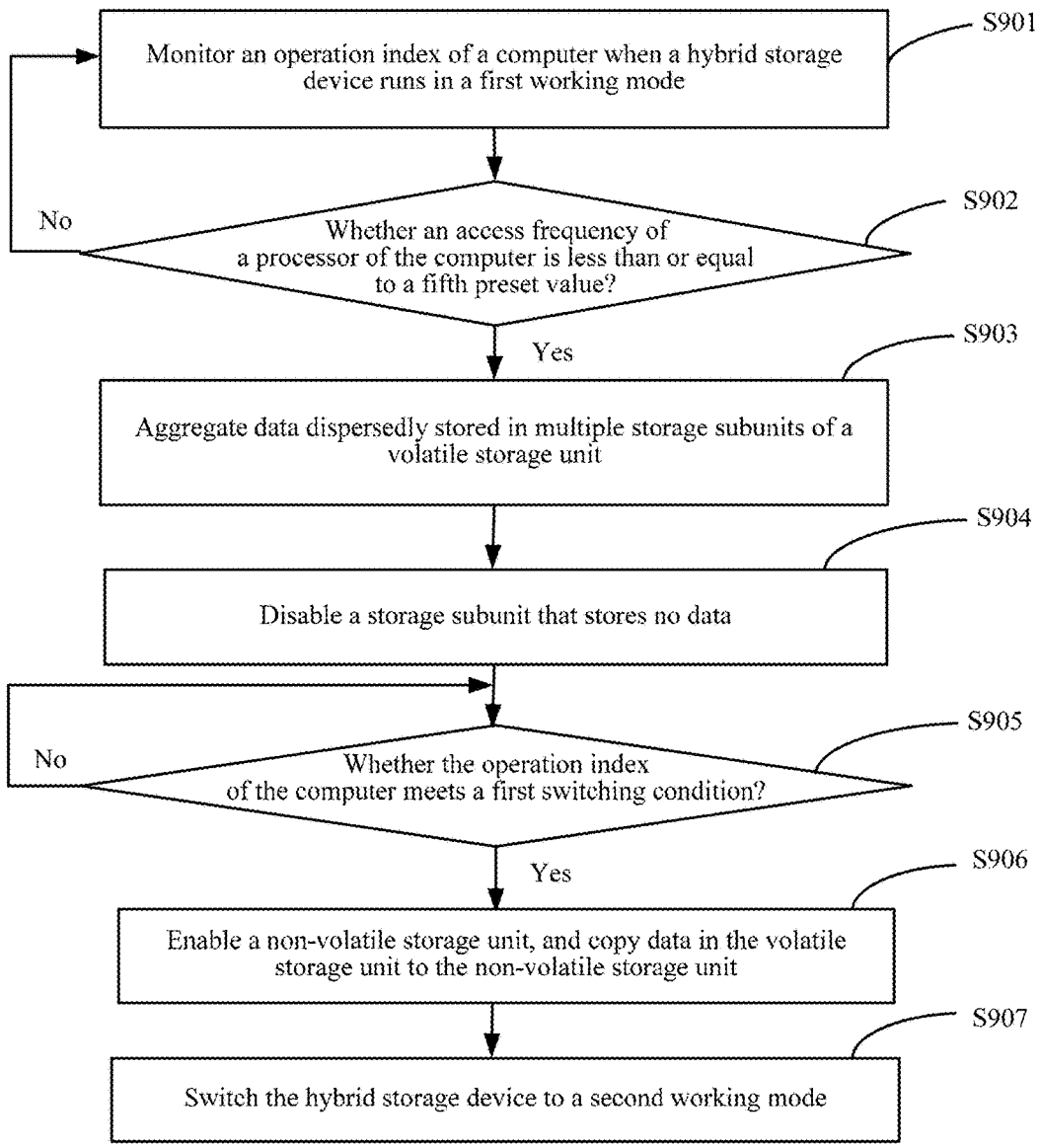
FIG. 9 is a flowchart of a third power consumption reduction method according to an embodiment of the present application.

As shown in FIG. 9, FIG. 9 is a flowchart of a third method for reducing power consumption of a hybrid storage device according to an embodiment of the present application. A volatile storage unit of the hybrid storage device to which the third method is applied to includes multiple storage subunits. The third method includes the following steps:

Step S901: Monitor a running parameter of the computer when a hybrid storage device runs in the first working mode.

Step S902: Determine whether an access frequency of a processor of the computer is less than or equal to a fifth preset value. If the access frequency of the processor of the computer is greater than the fifth preset value, step S902 is still performed; if the access frequency of the processor of the computer is less than or equal to the fifth preset value, step S903 is performed.

Step S903: Aggregate data dispersedly stored in the multiple storage subunits of the volatile storage unit.

Step S904: Disable a storage subunit that stores no data.

Step S905: Determine whether the monitored running parameter of the computer meets a first switching condition. If the monitored running parameter of the computer does not meet the first switching condition, step S905 is still performed; if the monitored running parameter of the computer meets the first switching condition, step S906 is performed.

Step S906: Enable anon-volatile storage unit, and copy data in the volatile storage unit to the non-volatile storage unit.

Step S907: Switch the hybrid storage device to a second working mode.

Figure 10:
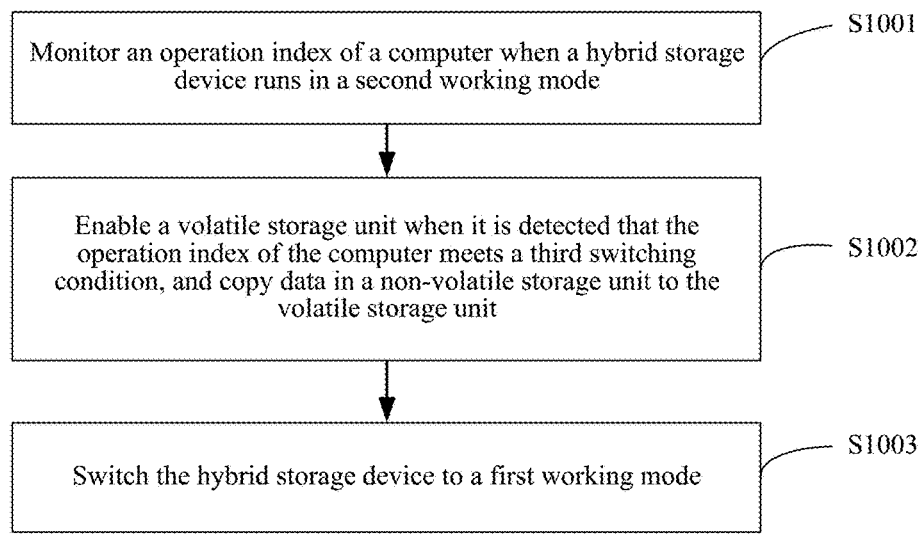
FIG. 10 is a flowchart of switching a hybrid storage device from a second mode to a first mode according to the power consumption reduction method in FIG. 7, FIG. 8, and FIG. 9.

After the hybrid storage device is switched to the second working mode, the methods for reducing power consumption of the hybrid storage device further include a step of switching the hybrid storage device to the first mode. Specifically, as shown in FIG. 10, the following steps are further included:

Step S1001: Monitor the running parameter of the computer when the hybrid storage device runs in the second working mode.

Step S1002: When it is detected that the running parameter of the computer meets a third switching condition, enable the volatile storage unit, and copy data in the non-volatile storage unit to the volatile storage unit.

Step S1003: Switch the hybrid storage device to the first working mode.

A running parameter of the non-volatile storage unit includes the access frequency of the processor of the computer. The third switching condition includes that the access frequency of the processor of the computer is greater than or equal to a sixth preset value.

Figure 11:
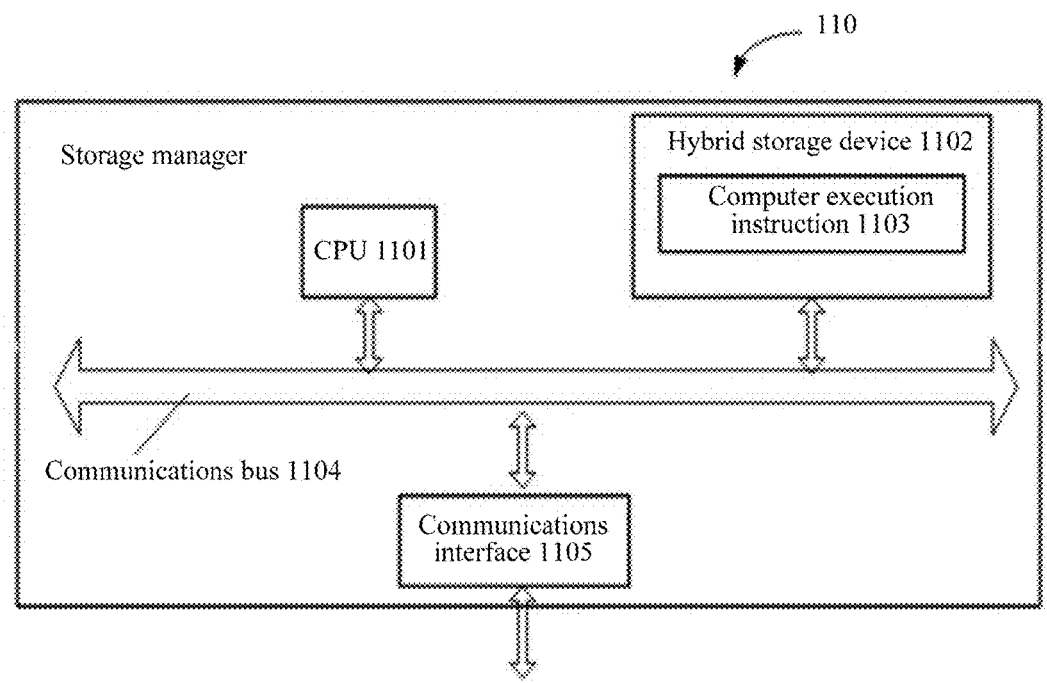
FIG. 11 is a schematic composition diagram of a structure of a computer according to an embodiment of the present application.

As shown in FIG. 11, FIG. 11 is a schematic composition diagram of a structure of a computer 110 according to an embodiment of the present application. The computer in this embodiment of the present application may include:

a processor 1101, a hybrid storage device 1102, a communications bus 1104, and a communications interface 1105. The central processing unit (CPU) 1101, the hybrid storage device 1102, and the communications interface 1105 are connected and communicate with each other by using the communications bus 1104.

The hybrid storage device 1102 includes a volatile storage unit (not shown in the figure) and a non-volatile storage unit (not shown in the figure). The hybrid storage device 1102 has two working modes. In a first working mode, the volatile storage unit is in an enabled state and is configured to store data, and the non-volatile storage unit is in a disabled state. In a second working mode, the non-volatile storage unit is in an enabled state and is configured to store data, and the volatile storage unit is in a disabled state.

The CPU 1101 may be a single-core or multi-core central processing unit, an application-specific integrated circuit, or one or more integrated circuits configured to implement this embodiment of the present application.

The hybrid storage device 1102 is configured to store a computer execution instruction 1103. Specifically, the computer execution instruction 1103 may include program code.

When a storage manager runs, the processor 1101 runs the computer execution instruction 1103, and can execute the method process in any one of FIG. 7 to FIG. 10.

An embodiment of the present application further provides a computer readable medium, including a computer execution instruction. When a processor of a computer executes the computer execution instruction, the computer executes the method in any one of FIG. 7 to FIG. 10.

A person of ordinary skill in the art may understand that all or a part of the steps of the methods in the embodiments may be implemented by a program instructing relevant hardware. The program may be stored in a computer readable storage medium. The storage medium may include: a read only memory (ROM), a random access memory (RAM), a magnetic disk, or an optical disc.

The hybrid storage device, the computer, the control device, and the power consumption reduction method provided in the embodiments of the present application are described in detail above. The principle and implementations of the present application are described herein through specific examples. The description about the embodiments is merely provided to help understand the method and core ideas of the present application. In addition, a person of ordinary skill in the art can make variations and modifications to the specific implementations and application scopes according to the ideas of the present application. Therefore, the content of this specification shall not be construed as a limit to the present application.

What is claimed is:

1. A hybrid storage device configured as a memory unit of a computer, the hybrid storage device comprising:
    a controller;
    a volatile storage unit; and
    a non-volatile storage unit;
    wherein:
    the hybrid storage device is configured to operate in two working modes, wherein in a first working mode, the volatile storage unit is in an enabled state, and the non-volatile storage unit is in a disabled state; and wherein in a second working mode, the non-volatile storage unit is in an enabled state, and the volatile storage unit is in a disabled state; and
    the controller is configured to: when the hybrid storage device operates in the first working mode, detect a running parameter of the computer; and based on the running parameter of the computer meeting a first switching condition, enable the non-volatile storage unit, copy data in the volatile storage unit to the non-volatile storage unit, and switch the hybrid storage device to the second working mode.

2. The hybrid storage device according to claim 1, wherein:
    the running parameter of the computer comprises an access frequency of a processor of the computer and a volume of data that has been stored in the volatile storage unit;
    the first switching condition comprises: the access frequency of the processor of the computer is less than or equal to a first preset value, and the volume of the data that has been stored in the volatile storage unit is less than or equal to a capacity of the non-volatile storage unit; and
    the controller is configured to copy all data that has been stored in the volatile storage unit to the non-volatile storage unit.

3. The hybrid storage device according to claim 1, wherein:
    the running parameter of the computer comprises an access frequency of a processor of the computer and a volume of active data that has been stored in the volatile storage unit;
    the first switching condition comprises: the access frequency of the processor of the computer is less than or equal to a second preset value, and the volume of the active data that has been stored in the volatile storage unit is less than or equal to a capacity of the non-volatile storage unit; and
    the controller is configured to copy the active data that has been stored in the volatile storage unit to the non-volatile storage unit.

4. The hybrid storage device according to claim 1, wherein:
    the first switching condition comprises a pre-switching condition and a second switching condition;
    the controller is configured to enable the non-volatile storage unit and copy data in the volatile storage unit to the non-volatile storage unit based on detecting the pre-switching condition; and
    the controller is further configured to: after the data in the volatile storage unit is copied to the non-volatile storage unit, detect whether the running parameter of the computer meets the second switching condition, and perform the switching operation after detecting that the running parameter of the computer meets the second switching condition.

5. The hybrid storage device according to claim 4, wherein:
    the running parameter of the computer comprises an access frequency of a processor of the computer and a volume of active data that has been stored in the volatile storage unit;
    the pre-switching condition comprises: the access frequency of the processor of the computer is less than or equal to a third preset value, and the volume of the active data that has been stored in the volatile storage unit is less than or equal to a capacity of the non-volatile storage unit;
    the second switching condition comprises: the access frequency of the processor of the computer is less than or equal to a fourth preset value, wherein the fourth preset value is less than the third preset value; and
    the controller is configured to copy the active data that has been stored in the volatile storage unit to the non-volatile storage unit.

6. The hybrid storage device according to claim 4, wherein the controller is further configured to:
before performing the switching operation, determine whether data in the non-volatile storage unit is consistent with the data in the volatile storage unit;
update the data in the non-volatile storage unit to be consistent with the data in the volatile storage unit when the data in the non-volatile storage unit is inconsistent with the data in the volatile storage unit; and
switch the hybrid storage device to the second working mode after performing the update operation.

7. The hybrid storage device according to claim 1, wherein:
the volatile storage unit comprises multiple storage subunits; and
the controller is further configured to: based on detecting that the access frequency of the processor of the computer is less than or equal to a fifth preset value, aggregate data dispersedly stored in the multiple storage subunits of the volatile storage unit; and disable, after the aggregation operation, a storage subunit that stores no data.

8. The hybrid storage device according to claim 1, wherein
the controller is further configured to: when the hybrid storage device operates in the second working mode, monitor the running parameter of the computer; and based on detecting that the running parameter of the computer meets a third switching condition, enable the volatile storage unit, copy data in the non-volatile storage unit to the volatile storage unit, and switch the hybrid storage device to the first working mode.

9. The hybrid storage device according to claim 8, wherein:
the running parameter of the computer comprises the access frequency of the processor of the computer; and
the third switching condition comprises: the access frequency of the processor of the computer is greater than or equal to a sixth preset value.

10. A computer, comprising:
a controller; and
a hybrid storage device, wherein the hybrid storage device comprises a volatile storage unit and a non-volatile storage unit, wherein the hybrid storage device is configured as a memory unit of the computer;
wherein:
the hybrid storage device is configured to operate in two working modes, wherein in a first working mode, the volatile storage unit is in an enabled state, and the non-volatile storage unit is in a disabled state; and wherein in a second working mode, the non-volatile storage unit is in an enabled state, and the volatile storage unit is in a disabled state; and
the controller is configured to: when the hybrid storage device runs in the first working mode, monitor a running parameter of the computer; and based on the running parameter of the computer meeting a first switching condition, enable the non-volatile storage unit, copy data in the volatile storage unit to the non-volatile storage unit, and switch the hybrid storage device to the second working mode.

11. The computer according to claim 10, wherein:
the running parameter of the computer comprises an access frequency of a processor of the computer and a volume of data that has been stored in the volatile storage unit;
the first switching condition comprises: the access frequency of the processor of the computer is less than or equal to a first preset value, and the volume of the data that has been stored in the volatile storage unit is less than or equal to a capacity of the non-volatile storage unit; and
the controller is configured to copy all data that has been stored in the volatile storage unit to the non-volatile storage unit.

12. The computer according to claim 10, wherein:
the running parameter of the computer comprises an access frequency of a processor of the computer and a volume of active data that has been stored in the volatile storage unit;
the first switching condition comprises: the access frequency of the processor of the computer is less than or equal to a second preset value, and the volume of the active data that has been stored in the volatile storage unit is less than or equal to a capacity of the non-volatile storage unit; and
the controller is configured to copy the active data that has been stored in the volatile storage unit to the non-volatile storage unit.

13. The computer according to claim 10, wherein:
the first switching condition comprises a pre-switching condition and a second switching condition;
the controller is configured to enable the non-volatile storage unit, and copy data in the volatile storage unit to the non-volatile storage unit based on detecting the pre-switching condition; and
the controller is further configured to: after the data in the volatile storage unit is copied to the non-volatile storage unit, detect whether the running parameter of the computer meets the second switching condition, and perform the switching operation after detecting that the running parameter of the computer meets the second switching condition.

14. The computer according to claim 13, wherein:
the running parameter of the computer comprises an access frequency of a processor of the computer and a volume of active data that has been stored in the volatile storage unit;
the pre-switching condition comprises: the access frequency of the processor of the computer is less than or equal to a third preset value, and the volume of the active data that has been stored in the volatile storage unit is less than or equal to a capacity of the non-volatile storage unit;
the second switching condition comprises: the access frequency of the processor of the computer is less than or equal to a fourth preset value, wherein the fourth preset value is less than the third preset value; and
the controller is configured to copy the active data that has been stored in the volatile storage unit to the non-volatile storage unit.

15. The computer according to claim 13, wherein the controller is further configured to:
before performing the switching operation, determine whether data in the non-volatile storage unit is consistent with the data in the volatile storage unit;
update the data in the non-volatile storage unit to be consistent with the data in the volatile storage unit when the data in the non-volatile storage unit is inconsistent with the data in the volatile storage unit; and
switch the hybrid storage device to the second working mode after performing the update operation.

16. The computer according to claim 10, wherein:
the volatile storage unit comprises multiple storage subunits; and
the controller is further configured to: based on detecting that the access frequency of the processor of the computer is less than or equal to a fifth preset value, aggregate data dispersedly stored in the multiple storage subunits of the volatile storage unit; and disable, after the aggregation operation, a storage subunit that stores no data.

17. The computer according to claim 10, wherein the controller is further configured to:
when the hybrid storage device operates in the second working mode, monitor the running parameter of the computer; and
based on detecting that the running parameter of the computer meets a third switching condition, enable the volatile storage unit, copy data in the non-volatile storage unit to the volatile storage unit, and switch the hybrid storage device to the first working mode.

18. The computer according to claim 17, wherein:
the running parameter of the computer comprises the access frequency of the processor of the computer; and
the third switching condition comprises: the access frequency of the processor of the computer is greater than or equal to a sixth preset value.

19. A power consumption reduction method for reducing power consumption of a hybrid storage device, wherein the hybrid storage device is configured as a memory of a computer and comprises a volatile storage unit and a non-volatile storage unit, wherein the hybrid storage device is further configured to operate in two working modes, and wherein the method comprises:
when the hybrid storage device runs in a first working mode, detecting a running parameter of the computer, wherein in the first working mode, the volatile storage unit is in an enabled state, and the non-volatile storage unit is in a disabled state; and
based on the running parameter of the computer meeting a first switching condition, enabling the non-volatile storage unit, copying data in the volatile storage unit to the non-volatile storage unit, and switching the hybrid storage device to a second working mode, wherein in the second working mode, the non-volatile storage unit is in an enabled state, and the volatile storage unit is in a disabled state.

20. The power consumption reduction method according to claim 19, wherein:
the running parameter of the computer comprises an access frequency of a processor of the computer and a volume of data that has been stored in the volatile storage unit;
the first switching condition comprises: the access frequency of the processor of the computer is less than or equal to a first preset value, and the volume of the data that has been stored in the volatile storage unit is less than or equal to a capacity of the non-volatile storage unit; and
copying data in the volatile storage unit to the non-volatile storage unit comprises copying all data that has been stored in the volatile storage unit to the non-volatile storage unit.

21. The power consumption reduction method according to claim 19, wherein:
the running parameter of the computer comprises an access frequency of a processor of the computer and a volume of active data that has been stored in the volatile storage unit;
the first switching condition comprises: the access frequency of the processor of the computer is less than or equal to a second preset value, and the volume of the active data that has been stored in the volatile storage unit is less than or equal to a capacity of the non-volatile storage unit; and
copying data in the volatile storage unit to the non-volatile storage unit comprises copying the active data that has been stored in the volatile storage unit to the non-volatile storage unit.

22. The power consumption reduction method according to claim 19, wherein:
the first switching condition comprises a pre-switching condition and a second switching condition;
the method further comprises: enabling the non-volatile storage unit and copying data in the volatile storage unit to the non-volatile storage unit based on detecting the pre-switching condition; and
after the data in the volatile storage unit is copied to the non-volatile storage unit the method further comprises: detecting whether the running parameter of the computer meets the second switching condition, and performing the switching operation after it is detected that the running parameter of the computer meets the second switching condition.

23. The power consumption reduction method according to claim 22, wherein:
the running parameter of the computer comprises an access frequency of a processor of the computer and a volume of active data that has been stored in the volatile storage unit;
the pre-switching condition comprises: the access frequency of the processor of the computer is less than or equal to a third preset value, and the volume of the active data that has been stored in the volatile storage unit is less than or equal to a capacity of the non-volatile storage unit;
the second switching condition comprises: the access frequency of the processor of the computer is less than or equal to a fourth preset value, wherein the fourth preset value is less than the third preset value; and
copying data in the volatile storage unit to the non-volatile storage unit comprises: copying the active data that has been stored in the volatile storage unit to the non-volatile storage unit.

24. The power consumption reduction method according to claim 22, the method further comprising:
before the switching operation is performed, determining whether data in the non-volatile storage unit is consistent with the data in the volatile storage unit; and
updating the data in the non-volatile storage unit to be consistent with the data in the volatile storage unit when the data in the non-volatile storage unit is inconsistent with the data in the volatile storage unit;
wherein the hybrid storage device is switched to the second working mode after the update operation is performed.

25. The power consumption reduction method according to claim 19, wherein the volatile storage unit comprises multiple storage subunits; and
wherein the method further comprises:
based on detecting that the access frequency of the processor of the computer is less than or equal to a fifth preset value, aggregating data dispersedly stored in the multiple storage subunits of the volatile storage unit; and disabling, after the aggregation operation, a storage subunit that stores no data.

26. The power consumption reduction method according to claim 19, the method further comprising:

when the hybrid storage device runs in the second working mode, monitoring the running parameter of the computer; and based on detecting that the running parameter of the computer meets a third switching condition, enabling the volatile storage unit, copying data in the non-volatile storage unit to the volatile storage unit, and switching the hybrid storage device to the first working mode.

27. The power consumption reduction method according to claim 26, wherein:

the running parameter of the computer comprises the access frequency of the processor of the computer; and the third switching condition comprises: the access frequency of the processor of the computer is greater than or equal to a sixth preset value.

* * * * *

UNITED STATES PATENT AND TRADEMARK OFFICE
CERTIFICATE OF CORRECTION

PATENT NO. : 10,430,096 B2
APPLICATION NO. : 15/882683
DATED : October 1, 2019
INVENTOR(S) : Yang et al.

It is certified that error appears in the above-identified patent and that said Letters Patent is hereby corrected as shown below:

On the Title Page

Column 2, Other Publications, "Zeng et al.," should read -- Zheng et al., --.

Signed and Sealed this
Seventeenth Day of March, 2020

Andrei Iancu
*Director of the United States Patent and Trademark Office*